Figure 1:
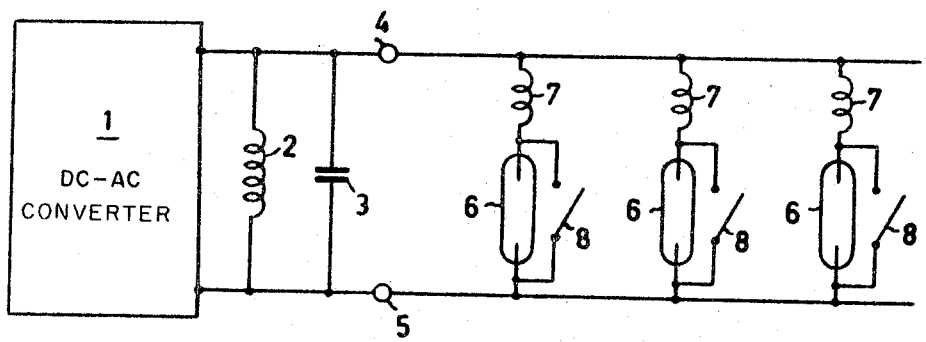

May 16, 1967     T. HEHENKAMP     3,320,549
ALTERNATING CURRENT GENERATOR HAVING PLURAL SWITCHABLE
LOADS IN RESONANT OUTPUT CIRCUIT
Filed Nov. 6, 1963

INVENTOR.
THEODORUS HEHENKAMP
BY
AGENT

United States Patent Office 3,320,549
Patented May 16, 1967

3,320,549
ALTERNATING CURRENT GENERATOR HAVING PLURAL SWITCHABLE LOADS IN RESONANT OUTPUT CIRCUIT
Theodorus Hehenkamp, Emmasingel, Eindhoven, Netherlands, assignor to North American Philips Company, Inc., New York, N.Y., a corporation of Delaware
Filed Nov. 6, 1963, Ser. No. 321,849
Claims priority, application Netherlands, Nov. 20, 1962, 285,738
3 Claims. (Cl. 331—75)

This invention relates to stabilized supply circuits for energizing an electrical load which may be varied over a wide range of operating conditions. More particularly, the invention relates to a circuit comprising an alternating current generator whose frequency is mainly determined by its output circuit which consists of the parallel-combination of an inductance and a capacitance and of the loads connected thereto and in parallel with each other. The loads are individually switchable into and out of circuit and consist of the series-combination of a reactive impedance and an ohmic impedance, in particular, of reactively stabilized gas and/or vapor discharge tubes.

The alternating current generator may be an electrical or mechanical device which converts direct current or alternating current of low frequency into an alternating current having a frequency of, for example, 400 cycles per second or 7,000 cycles per second.

In the case where the overall load varies as a result of the switching of individual loads into or out of the circuit, the frequency produced and hence the output alternating voltage varies.

An object of the invention is to provide a supply circuit for a plurality of individually switchable loads wherein the frequency and the output voltage of the supply circuit are relatively constant despite wide variations in the overall load on the circuit.

Another object of the invention is to render the loads individually switchable without changing the frequency and the output voltage to such a great extent as would be the case upon interruption of the current circuit of the concerned load.

According to the invention, the ohmic impedances are bridged by individual short-circuit switches. Instead of interrupting the current circuit of the concerned load, according to the invention, the ohmic impedance of this load is short-circuited.

It is known that fluorescent low-pressure mercury vapour lamps may be energized with alternating current from a direct-current source by means of a converter and that in order to switch such tubes out of the circuit they may be short circuited. The lamps in this case are connected in series with each other to the output terminals of the alternating current source. In this case, the purpose of the short-circuit is to prevent the remaining lamps of the series circuit from being put out of operation. At the same time, however, the alternating voltage produced must also be reduced. To accomplish this end, each lamp is supplied by an individual leakage field transformer in which the primary winding must be interrupted when the lamp is short-circuited.

Figure 2:
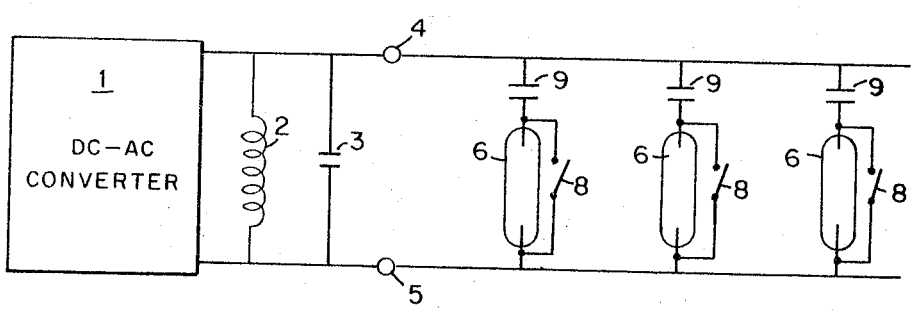

In order that the invention may be readily carried into effect, it will now be described more fully with reference to the accompanying drawings wherein FIGS. 1 and 2 show first and second embodiments in accordance with the invention.

Reference numeral 1 denotes an alternating current generator, for example, a D.C.-A.C. converter having an output circuit which consists of the parallel-combination of an inductance 2, a capacitance 3 and a plurality of gas discharge tubes 6 connected thereto through terminals 4 and 5. Each of the tubes is connected in series with an inductance 7. A short circuit switch 8 is connected in parallel with each tube 6.

In a practical embodiment, the operating voltage between the terminals 4 and 5 amounted to approximately 243 volts at a frequency of approximately 6,720 cycles per second. The inductance 2 had a value of approximately 3 mH and the capacitance 3 had a value of approximately 1.7 μf. The discharge tubes 6 were fluorescent low-pressure mercury vapour discharge tubes consuming, at a tube voltage of approximately 100 volts, approximately 380 ma. The number of tubes amounted to 29.

With the tubes on, the voltage across the inductances 7 amounts to approximately 220 volts.

According to the invention, the tubes are individually switched out of the circuit by closing the switch 8 which bridges the tube concerned. The current through the associated inductance 7 then increases from 380 ma. to approximately 420 ma.

When, for example, nine of the tubes 6, that is to say approximately 30% of the tubes, are extinguished by closing the concerned short-circuit switches 8, the output voltage of the generator increases from 243 volts to 250 volts, that is to say by approximately 3%. The frequency then decreases from 6,720 cycles per second to 6,600 cycles per second, that is to say, by approximately 1.7%.

If, however, the same number of tubes is switched out of circuit by an interruption of the concerned tube circuits, the supply voltage increases from 243 volts to approximately 280 volts, that is to say, by approximately 15%, and the generator frequency decreases from 6,720 cycles per second to 6,070 cycles per second, that is to say, by approximately 10%, which is, of course, undesirable.

As a matter of fact, by a suitable choice of the parameters of the output circuit of the alternating current generator, the reactive load impedances, which are shown as inductors 7 in FIG. 1, may instead comprise individual capacitors or the combination of an inductor and capacitor for each load branch.

FIG. 2 illustrates an embodiment of the invention wherein the reactive load impedances, i.e. inductors 7 of FIG. 1, are replaced by capacitors 9. The rest of the circuit is structurally similar to the embodiment of FIG. 1. In the circuit of FIG. 2, the tubes 6 are capacitively stabilized, but the circuit otherwise operates in the same manner as the circuit of FIG. 1.

Although the invention has been described by reference to a specific embodiment thereof, many modifications may be made therein without departing from the spirit and scope of the invention, which is limited only as defined in the appended claims.

What is claimed is:
1. An electrical supply circuit comprising, a generator of alternating current having a frequency determining output circuit including the parallel connected combination of an inductance and a capacitance, a plurality of electrical load devices connected in parallel across said output circuit, each of said devices comprising, a reactive impedance element and a substantially resistive element connected in series circuit and switch means connected across said resistive element for individually switching said resistive element in or out of the circuit.

2. A circuit as described in claim 1 wherein said resistive elements comprise gas discharge tubes and said reactive element comprises an inductance.

3. A circuit as described in claim 1 wherein said resistive elements comprise gas discharge tubes and said reactive element comprises a capacitor.

References Cited by the Examiner

UNITED STATES PATENTS 2,964,676    12/1960    Davies et al. _____ 331—113

ROY LAKE, *Primary Examiner.*

S. H. GRIMM, *Assistant Examiner.*